(12) United States Patent
Oh et al.

(10) Patent No.: US 8,407,357 B2
(45) Date of Patent: Mar. 26, 2013

(54) GROUP MANAGEMENT METHOD AND SYSTEM IN INTERWORKING SYSTEM OF IMPS SYSTEM AND SIMPLE IM SYSTEM

(75) Inventors: Jae-Kwon Oh, Seoul (KR); Ajithkumar Narayanakurup, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 492 days.

(21) Appl. No.: 12/063,009

(22) PCT Filed: Aug. 12, 2006

(86) PCT No.: PCT/KR2006/003173
§ 371 (c)(1),
(2), (4) Date: Jul. 11, 2008

(87) PCT Pub. No.: WO2007/021111
PCT Pub. Date: Feb. 22, 2007

(65) Prior Publication Data
US 2008/0281931 A1      Nov. 13, 2008

(30) Foreign Application Priority Data

Aug. 12, 2005   (IN) .......................... 1125/CHE/2005

(51) Int. Cl.
*H04B 7/00* (2006.01)
*H04L 12/66* (2006.01)
*G06F 15/16* (2006.01)
(52) U.S. Cl. ........ 709/230; 709/206; 709/207; 709/217; 455/518; 370/352
(58) Field of Classification Search ........... 709/230–237
See application file for complete search history.

(56) References Cited

U.S. PATENT DOCUMENTS
(Continued)

FOREIGN PATENT DOCUMENTS
| JP | 2004-208302 A | 7/2004 |
|---|---|---|
| JP | 2005-505054 A | 2/2005 |

(Continued)

OTHER PUBLICATIONS

Wireless Village Initiative, WV-022 Client-Server Protocol Session and Transactions Verison 1.1, Draft Version Jan. 10, 2002, pp. 87-88.*

(Continued)

*Primary Examiner* — Ian N Moore
*Assistant Examiner* — Jenee Alexander
(74) *Attorney, Agent, or Firm* — Jefferson IP Law, LLP

(57) ABSTRACT

Provided is a group management method and system for group communication in an in-terworking system of an Instant Messaging and Presence Services (IMPS) system and a Session Initiation Protocol for Instant Messaging and Presence Leveraging Extensions Instant Messaging (SIMPLE IM) system. In the group management method, a client currently connected to one of the IMPS system and the SIMPLE IM system requests the retrieval of the group properties of a group included in the other system to which the client is not connected. The group property retrieval request is converted into a protocol format supported by the other system and is forwarded to the other system. The other system retrieves the group properties of the group, generates a group property response including the retrieved group properties, and forwards the group property response. The group property response is converted into a protocol format supported by the currently connected system and is forwarded to the currently connected system. The currently connected system forwards the group property response to the client.

14 Claims, 16 Drawing Sheets

U.S. PATENT DOCUMENTS

| | | | |
|---|---|---|---|
| 2005/0213537 A1* | 9/2005 | Ingimundarson et al. | 370/329 |
| 2005/0232406 A1* | 10/2005 | Kauppinen | 709/204 |
| 2005/0267969 A1* | 12/2005 | Poikselka et al. | 709/225 |
| 2005/0267984 A1* | 12/2005 | Costa-Requena et al. | 709/238 |
| 2006/0046757 A1* | 3/2006 | Hoover et al. | 455/518 |
| 2006/0046758 A1* | 3/2006 | Emami-Nouri et al. | 455/518 |
| 2006/0089167 A1* | 4/2006 | Idnani | 455/518 |
| 2006/0182129 A1* | 8/2006 | Mutch et al. | 709/217 |
| 2006/0209794 A1* | 9/2006 | Bae et al. | 370/352 |
| 2007/0038640 A1 | 2/2007 | Mu et al. | |
| 2007/0124454 A1 | 5/2007 | Watkinson | |
| 2009/0157816 A1 | 6/2009 | Pattan et al. | |
| 2009/0248816 A1 | 10/2009 | Appelman et al. | |

FOREIGN PATENT DOCUMENTS

KR   10-2006-0107369 A   10/2006

OTHER PUBLICATIONS

Saint-Andre et al., Basic Messaging and Presence Interoperability between the Extensible Messaging and Presence Protocol (XMPP) and Session Initiation Protocol (SIP) for Instant Messaging and Presence Leveraging Extension (SIMPLE), Aug. 8, 2005.

IMPS-SIP/SIMPLE Interworking Function Architecture, Open Mobile Alliance Ltd, Draft Version 0.2, May 20, 2005.

\* cited by examiner

GROUP MANAGEMENT METHOD AND SYSTEM IN INTERWORKING SYSTEM OF IMPS SYSTEM AND SIMPLE IM SYSTEM

TECHNICAL FIELD

The present invention relates to an instant messaging system, and in particular, to a user group management method and system for group communications in an interworking system of an Instant Messaging and Presence Services (IMPS) system and a Session Initiation Protocol for Instant Messaging and Presence Leveraging Extensions (SIMPLE) IM system.

BACKGROUND ART

Presently, within Open Mobile Alliance (OMA), there are two different Instant Messaging technologies; the Instant Messaging and Presence Services (IMPS) based IM technology and SIMPLE protocol based IM technology. These IM technologies use groups defined by a user of an instant message to enable group communication. In an IMPS system, the user defined groups are stored in an IMPS server. The IMPS system uses IMPS specific protocols such as Client Server Protocol (CSP) and Server to Server Protocol (SSP) for performing various operations on these groups like getting the group information and setting the group information. In a SIMPLE IM system, user-defined group related information is stored in Extensible Markup Language (XML) formats in an Instant Messaging XML Document Management Server (IM XDMS) and uses XML Configuration Access Protocol (XCAP) to access or modify the group information.

In OMA, if the architecture for interworking between theses two IM systems should be generated, for example, if an IMPS user sends an instant message to a SIMPLE IM user or SIMPLE IM users send an instant message to an IMPS user, new network elements and message flows need to be identified because the IM systems use different protocols. OMA has already come out with the architecture for delivering IMPS instant messages to an SIMPLE IM system and vice-versa.

When a SIMPLE IM user sends an instant message to an IMPS user, a process of sending the instant message is as follows. A SIMPLE IM user composes a message using a SIMPLE IM Client and sends the message to a SIMPLE IM server. A message header contains the ID of the IMPS User. From the recipient ID, the SIMPLE Server understands that the message is targeted for the IMPS user. The SIMPLE IM server sends the message to an Interworking Function (IWF). The IWF converts the instant message sent by the SIMPLE system based on the IMPS protocols and sends to the IMPS Server. Finally the IMPS Server delivers the instant message to the IMPS recipient. In the case of notifications from the SIMPLE IM user to the IMPS server, the IWF receives the IMPS specific notifications from the IMPS server and converts them as per the SIMPLE protocol and notifies the SIMPLE IM Client through the SIMPLE IM server.

When the IMPS user sends an instant message to the SIMPLE IM user, a process of sending the instant message is as follows. The IMPS user composes the message using a IMPS client and sends the message to the IMPS server. The message header contains the ID of the SIMPLE IM user. From the recipient ID, the IMPS server understands that the message is targeted for the SIMPLE IM user. The IMPS server sends the message to the IWF. The IWF converts the instant message sent by the IMPS system, based on the SIMPLE protocol and sends to the SIMPLE server. Finally the SIMPLE server delivers the message to the SIMPLE IM recipient. In the case of notifications from the SIMPLE IM server to the IMPS user, the IWF receives the SIMPLE specific notifications from the SIMPLE server and converts them as per the IMPS protocols and notifies the IMPS client through the IMPS server.

DISCLOSURE OF INVENTION

Technical Problem

The existing IMPS-SIMPLE IM interworking system provides an IM transmission and reception service to each system, but does not have group management methods for group communication of an IM service.

The present invention provides a method for managing groups used for group communication in interworking between an IMPS system and a SIMPLE IM system.

The present invention also provides a method by which an IMPS user can set and retrieve the properties/information of a group, which is included in a SIMPLE IM system.

The present invention also provides a method by which a SIMPLE IM user can set and retrieve the properties/information of a group, which is included in an IMPS system.

Technical Solution

To achieve the foregoing objects, there is provided a group management method for group communication in an interworking system of an Instant Messaging and Presence Services (IMPS) system and a Session Initiation Protocol for Instant Messaging and Presence Leveraging Extensions Instant Messaging (SIMPLE IM) system. In the group management method, a client currently connected to one of the IMPS system and the SIMPLE IM system requests the retrieval of the group properties of a group included in the other system to which the client is not connected. The group property retrieval request is converted into a protocol format supported by the other system and is forwarded to the other system. The other system retrieves the group properties of the group, generates a group property response including the retrieved group properties, and forwards the group property response. The group property response is converted into a protocol format supported by the currently connected system and is forwarded to the currently connected system. The currently connected system forwards the group property response to the client.

There is also provided a group management system for group communication in an interworking system of an IMPS system and a SIMPLE IM system. The group management system includes the IMPS system, the SIMPLE IM system, and an Interworking Function (IWF). The IMPS system forwards a group property retrieval request GetGroupPropsRequest and a group property setting request SetGroupPropsRequest received from an IMPS client to the IWF if they include the group ID of a group included in the SIMPLE IM system, retrieves the group according to a GetGroupPropsRequest received from the WIF, forwards a GetGroupPropsResponse including the retrieved group properties to the IWF, and sets the group properties of the group based on the group properties included in the group property setting request according to a SetGroupPropsRequest received from the IWF. The SIMPLE IM system forwards a group property retrieval request HTTP XCAP GET request and a group property setting request HTTP XCAP PUT request received from an XDM client of the SIMPLE IM system to the IWF if they include the group ID of a group included in the IMPS system, retrieves the group according to the HTTP XCAP GET request received from the IWF, forwards an XCAP 200 OK including an XML document with group properties to the IWF, and sets the group properties of the group based on the group properties included in the group property setting request according to an HTTP XCAP PUT request received from the IWF. The IWF converts the GetGroupPropsRequest and the SetGroupPropsRequest received from the IMPS system into the HTTP XCAP GET request and the HTTP XCAP PUT request to forward them to the SIMPLE IM system, converts the HTTP XCAP GET request and the HTTP XCAP PUT request received from the SIMPLE IM system into the GetGroupPropsRequest and the SetGroupPropsRequest to forward them to the IMPS system, converts the GetGroupPropsResponse including the group property retrieval response received from the IMPS system into the XCAP 200 OK with the group XML document in which the group property retrieval response is converted suitably for the SIMPLE IM system to forward it to the SIMPLE IM system, converts the XCAP 200 OK with the XML document including the group property retrieval response received from the SIMPLE IM system into the GetGroupPropsResponse including the group property retrieval response converted suitably for the IMPS system to forward it to the IMPS system, converts the Status including the group property setting response received from the IMPS system into the XCAP response having the XCAP 200 OK in which the group property setting response is converted suitably for the SIMPLE IM system to forward it to the SIMPLE IM system, and converts the XCAP 200 OK including the group property setting response received from the SIMPLE IM system into the Status including the group property setting response converted suitably for the IMPS system to forward it to the IMPS system.

Advantageous Effects

The present invention enables the SIMPLE IM user to retrieve the group properties of a group included in the IMPS system and the IMPS user to retrieve the group properties of a group included in the SIMPLE IM system. The present invention may also enable the SIMPLE IM user to set the group properties of a group included in the IMPS system and the IMPS user to set the group properties of a group included in the SIMPLE IM system.

BEST MODE FOR CARRYING OUT THE INVENTION

Figure 1:
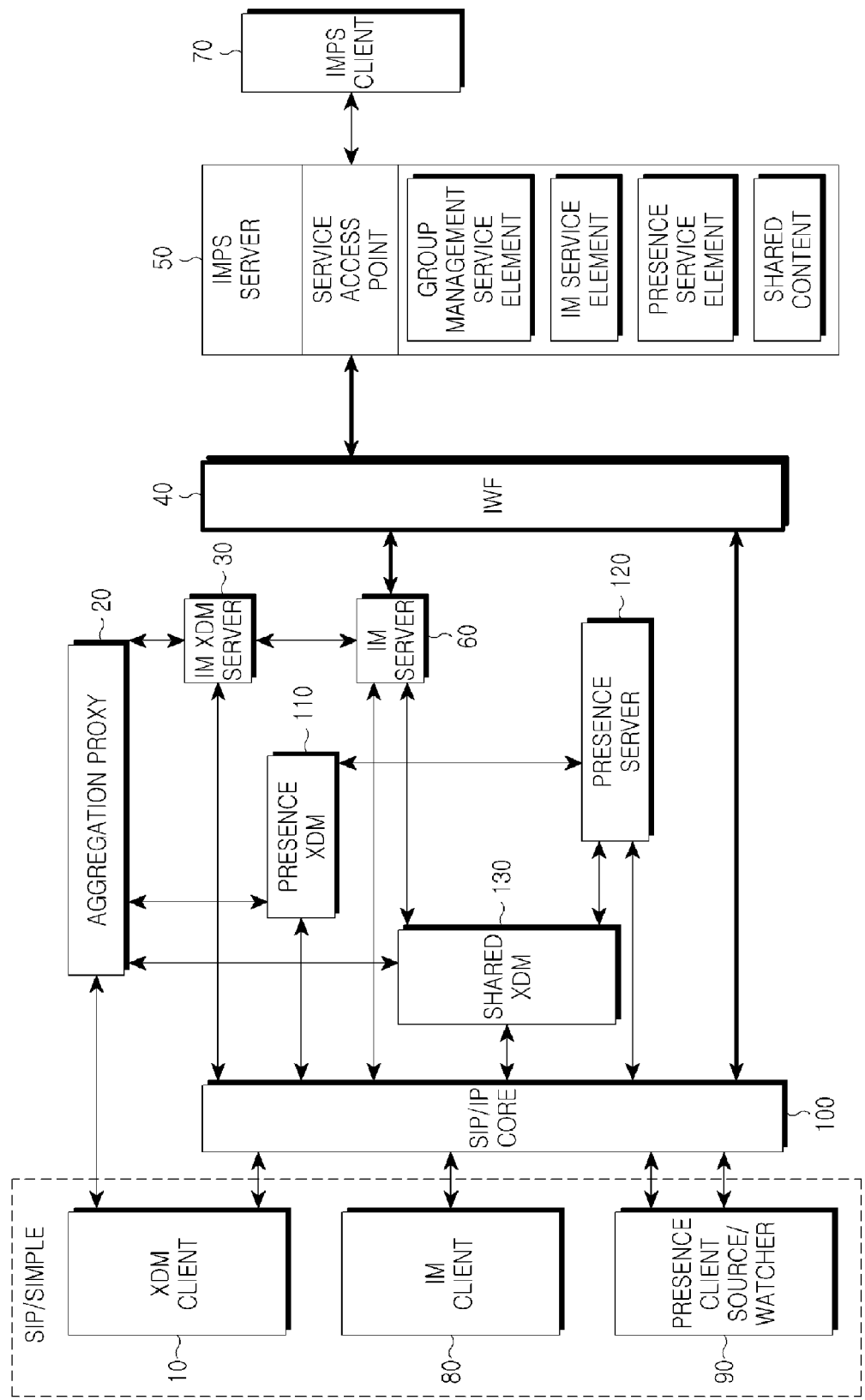
FIG. 1 illustrates the structure of an OMA SIMPLE IM system.

Hereinafter, preferred embodiments of the present invention will be described in detail with reference to the annexed drawings. Like reference numerals and symbols refer to like elements throughout drawings. In the following description, a detailed description of known functions and configurations incorporated herein has been omitted for conciseness.

FIG. 1 illustrates the structure of an interworking system of a SIMPLE IM system and an IMPS system to which the present invention is applied. Referring to FIG. 1, the interworking system includes an XML Document Management (XDM) client 10, an Instant Message (IM) client 80, a presence client 90, a Session Initiation Protocol(SIP)/Initiation Protocol(IP) CORE 100, a shared XDM 130, an aggregation proxy 20, an IM XDM server 30, an IM server 60, a presence server 120, an Interworking Function(IWF) 40, an IMPS server 50, and an IMPS client 70. The XDM client 10, the IM client 80, and the presence client 90 are connected to a SIMPLE IM system and the SIP/IP CORE 100, the shared XDM 130, the aggregation proxy 20, the IM XDM server 30, the IM server 60, and the presence server 120 are included in the SIMPLE IM system. The IMPS client 70 is connected to an IMPS system and the IMPS server 50 is included in the IMPS system. The IWF 40 converts a message received from the SIMPLE IM system into an IMPS protocol format to forward it to the IMPS server 50 and converts a message received from the IMPS server into a SIMPLE protocol format to forward it to the IM server 60 or the IM XDM server 30 for interworking between the SIMPLE IM system and the IMPS system.

In the interworking system, a user connected to the IMPS system retrieves and sets the properties of a specific group included in the SIMPLE IM system as follows. The IMPS client 70 of a user of the IMPS system generates a request for retrieving or setting the properties of a group included in the SMPLE IM and sends the request to the IMPS server 50. If the IMPS client 70 requests the retrieval of the properties of a group, it sends an IMPS group property retrieval request ?GetGroupPropsRequest? with the ID of the group to the IMPS server 50. If the IMPS client 70 requests the setting of the properties of a group, it sends an IMPS group property setting request SetGroupPropsRequest with the ID of the group and the properties to be set to the IMPS server 50. Upon receipt of GetGroupPropsRequest? or SetGroupPropsRequest, the IMPS server 50 understands that a targeted group is included in the SIMPLE IM system through the included group ID and sends the request to the IWF 40. The IWF 40 performs necessary protocol conversions from the IMPS protocol to the SIMPLE protocol and sends a SIMPLE IM group property retrieval request HTTP XCAP GET request or a SIMPLE IM group property setting request HTTP XCAP PUT request to the IM XDM server 30. If the request is the group property retrieval request, the IM XDM server 30 retrieves the properties of the group and sends a XCAP 200 OK message with an XML document of the group included in the body of the message to the IWF 40 as a group property retrieval response. If the request is the group property setting request, the IM XDM server 30 sets the properties of the document of the group as requested and sends an XCAP 200 OK message alone to the IWF 40 as a group property retrieval response. Upon receipt of the XCAP 200 OK response, as the group property retrieval response, the IWF 40 converts it into a group property retrieval response of the IMPS system GetGroupPropsResponse to forward it to the IMPS server 50. Upon receipt of the XCAP 200 OK response as the group property setting response, the IWF 40 converts it into a group property setting response of the IMPS system Status to forward it to the IMPS server 50. The IMPS server 50 transmits these responses to the IMPS client 70.

According to the present invention, a user connected to the SIMPLE IM system retrieves and sets the properties of a group included in the IMPS system as follows. The XDM client 10 of the user of the SIMPLE IM system generates a request for retrieving or setting the properties of a group included in the IMPS system and sends it to the IM XDM server 30. If the XDM client 10 requests the retrieval of the properties of a group, the XDM client 10 transmits the HTTP XCAP GET request with the ID of the group. If the XDM client 10 requests the setting of the properties of a group, the XDM client 10 transmits the HTTP XCAP PUT request with the ID of the group and an XML document for the properties to be set. The request is transmitted to the IM XDM server 30 through the aggregation proxy 20. The IM XDM server 30 understands that the targeted group is included in the IMPS system through the ID of the group included in the HTTP XCAP GET request or HTTP XCAP PUT request and transmits the request to the IWF 40. The IWF 40 performs necessary protocol conversion (SIMPLE to IMPS), generates an IMPS specific request for group management operations of the IMPS system, i.e., GetGroupPropsRequest for group property retrieval or SetGroupPropsRequest for group property setting, and transmits the request to the IMPS server 50. If the request is a group property retrieval request, the IMPS server 50 responds with an IMPS group property retrieval response including corresponding group properties, i.e., GetGroupPropsResponse. If the request is a group property setting request, the IMPS server 50 responds with an IMPS group property setting response, i.e., Status, as the result of group property setting. The IWF 40 receives the response, converts it into a SIMPLE group property response, and transmits it to the IM XDM server 30. In other words, if the response is the group property retrieval response GetGroupPropsResponse, the IWF 40 converts the response into an XCAP 200 OK including an XML document in which IMPS group properties included in the response are converted into SIMPLE group properties to the IM XDM server 30. If the response is the group property setting response Status, the IWF 40 converts the response into an XCAP 200 OK and transmits it to the IM XDM server 30. The IM XDM server 30 transmits the response to the XDM client 10 of the SIMPLE IM system.

A process in which a SIMPLE IM user manages a static group included in the IMPS system according to an embodiment of the present invention, will be described in detail with reference to FIGS. 2 through 7.

Figure 2:
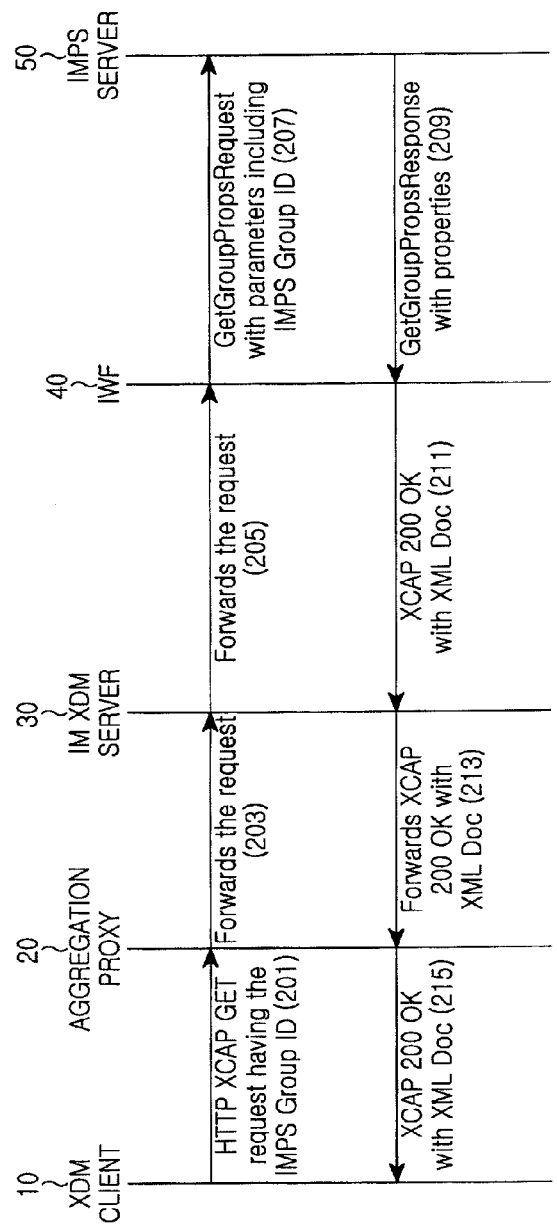
FIG. 2 illustrates a process in which an XDM client in an untrusted domain requests the retrieval of the properties of a group included in an IMPS system through an IM XDM server and receives a response to the request, according to an embodiment of the present invention.
Figure 3:
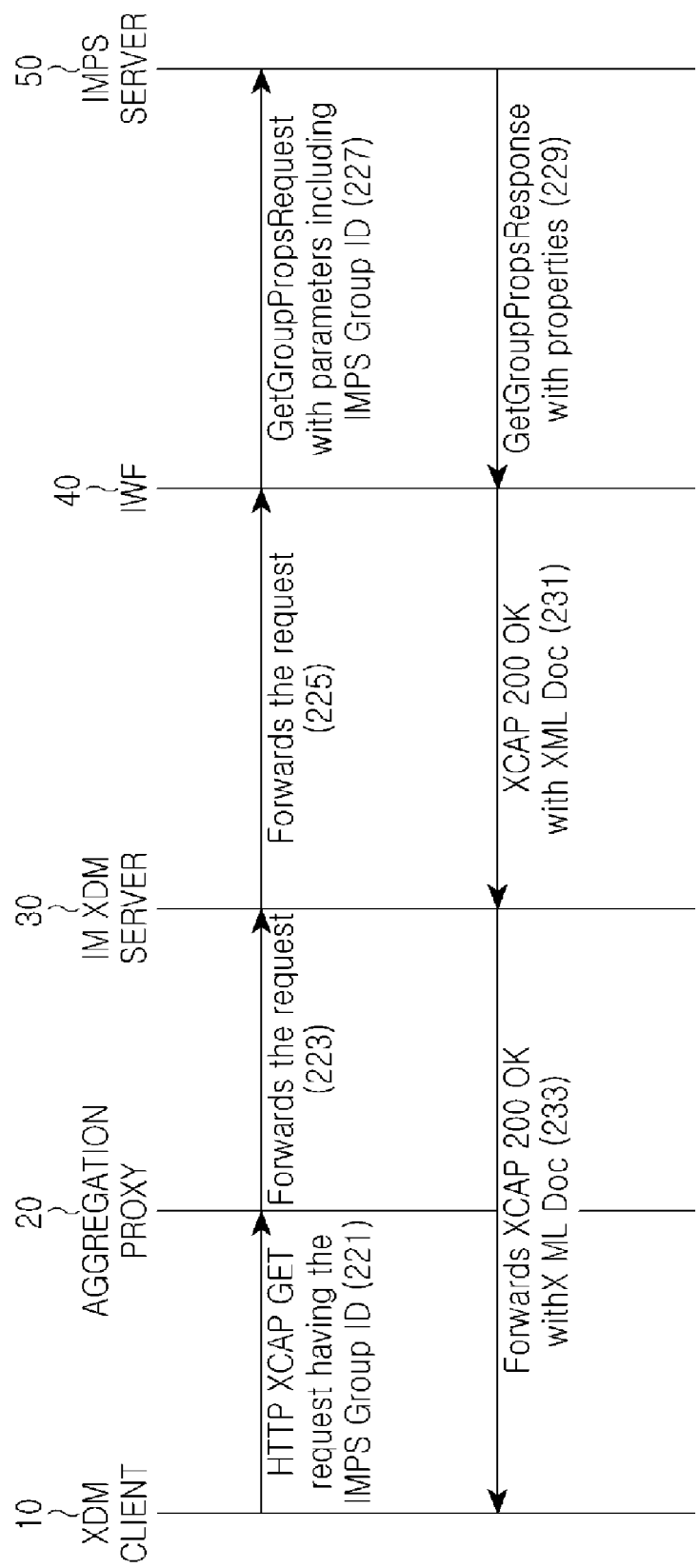
FIG. 3 illustrates a process in which an XDM client in an untrusted domain requests the retrieval of the properties of a group included in an IMPS system through an IM XDM server and directly receives a response to the request without using an aggregation proxy, according to another embodiment of the present invention.

A process in which the SIMPLE IM user retrieves the properties of a group included in the IMPS using the XDM client 10 will be described with reference to FIGS. 2 and 3. FIG. 2 illustrates a process in which a SIMPLE IM client requests the retrieval of the properties of a group included in an IMPS system and receives a response to the request according to an embodiment of the present invention, and FIG. 3 illustrates a process in which a SIMPLE IM client requests the retrieval of the properties of a group included in an IMPS system and receives a response to the request according to another embodiment of the present invention.

A process in which the XDM client 10 as the SIMPLE IM user retrieves the properties of a group included in an IMPS will be described with reference to FIG. 2. Here, it is assumed that the XDM client 10 is included in an untrusted domain. In this scenario, the XDM client 10 transmits a group property retrieval request HTTP XCAP GET request to the aggregation proxy 20 in step 201. The HTTP XCAP GET request includes the group ID of the targeted group (HTTP XCAP GET request having the IMPS group ID). The aggregation proxy 20 forwards the request to the IM XDM server 30

(Forwards the request). The IM XDM server 30 understands that the group is included in the IMPS system through the group ID included in the HTTP XCAP GET request and forwards the request to the IWF 40 in step 205 (Forwards the request). The IWF 40 receives the HTTP XCAP GET request including the IMPS group ID. The IWF 40 converts the protocol of the group ID with the HTTP XCAP GET request to generate an IMPS group property retrieval request GetGroupPropsRequest and forwards it to the IMPS server 50 (GetGroupPropsRequest with parameters including IMPS group ID). The IMPS server 50 retrieves the properties of the group and forwards an IMPS group property retrieval response GetGroupPropsResponse including the properties to the IWF 40 in step 209 (GetGroupPropsResponse with properties). The IWF 40 retrieves group properties from the GetGroupPropsResponse received from the IMPS server 50 to generate an XML document including the group properties according to the SIMPLE protocol and forwards the XCAP 200 OK including the XML document to the IM XDM server 30 in step 211 (XCAP 200 OK with XML Doc). The IM XDM server 30 forwards the received XCAP 200 OK to the aggregation proxy 20 in step 213 (Forwards XCAP 200 OK with XML Doc) and the aggregation proxy 20 forwards the received XCAP 200 OK to the XDM client 10 in step 215 (XCAP 200 OK with XML Doc). The IM XDM server 30 may also forwards the response directly to the XDM client 10 like in step 233 without using the aggregation proxy 20 like in FIG. 3. Steps 221 through 231 of FIG. 3 correspond to steps 201 through 211 of FIG. 2.

Figure 4:
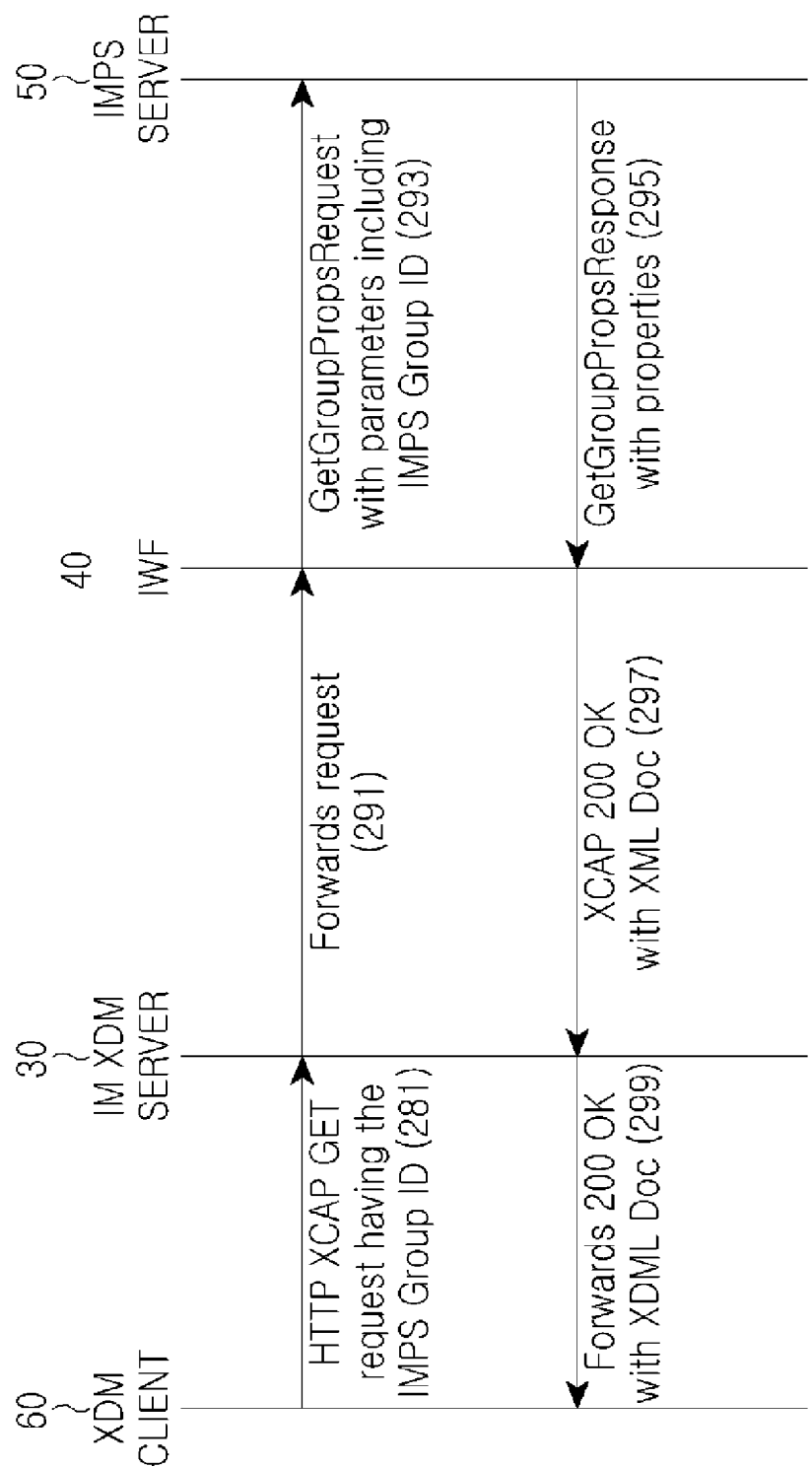
FIG. 4 illustrates a process in which an XDM client in a trusted domain requests the retrieval of the properties of a group included in an IMPS system through an IM XDM server and receives a response to the request, according to an embodiment of the present invention.

If the XDM client 10 is included in a trusted domain, a process in which the XDM client 10 requests the retrieval of the properties of a group included in the IMPS system and receives a response to the request is as shown in FIG. 4. FIG. 4 illustrates a process in which a SIMPLE IM client in a trusted domain requests the retrieval of the properties of a group included in the IMPS system and receives a response to the request according to an embodiment of the present invention. This scenario may also be applied to a case where the IM server 60 as an XDM client requests the retrieval of the properties of a group included in the IMPS system and receives a response to the request. Referring to FIG. 4, the XDM client 60 directly sends an HTTP XCAP GET request including the group ID of the targeted group to the IM XDM server 30 without using the aggregation proxy 20 in step 281 (HTTP XCAP GET request having the IMPS group ID). The IM XDM server 30 understands that the targeted group is included in the IMPS system through the group ID included in the HTTP XCAP GET request and forwards the request to the IWF 40 in step 291 (Forwards the request). The subsequent process is similar to a process shown in FIGS. 2 and 3. In other words, step 293 of FIG. 4 is similar to step 207 of FIG. 2, step 295 of FIG. 4 is similar to step 209 of FIG. 2, step 297 of FIG. 4 is similar to step 211 of FIG. 2, and step 299 of FIG. 4 is similar to step 233 of FIG. 3.

Figure 5:
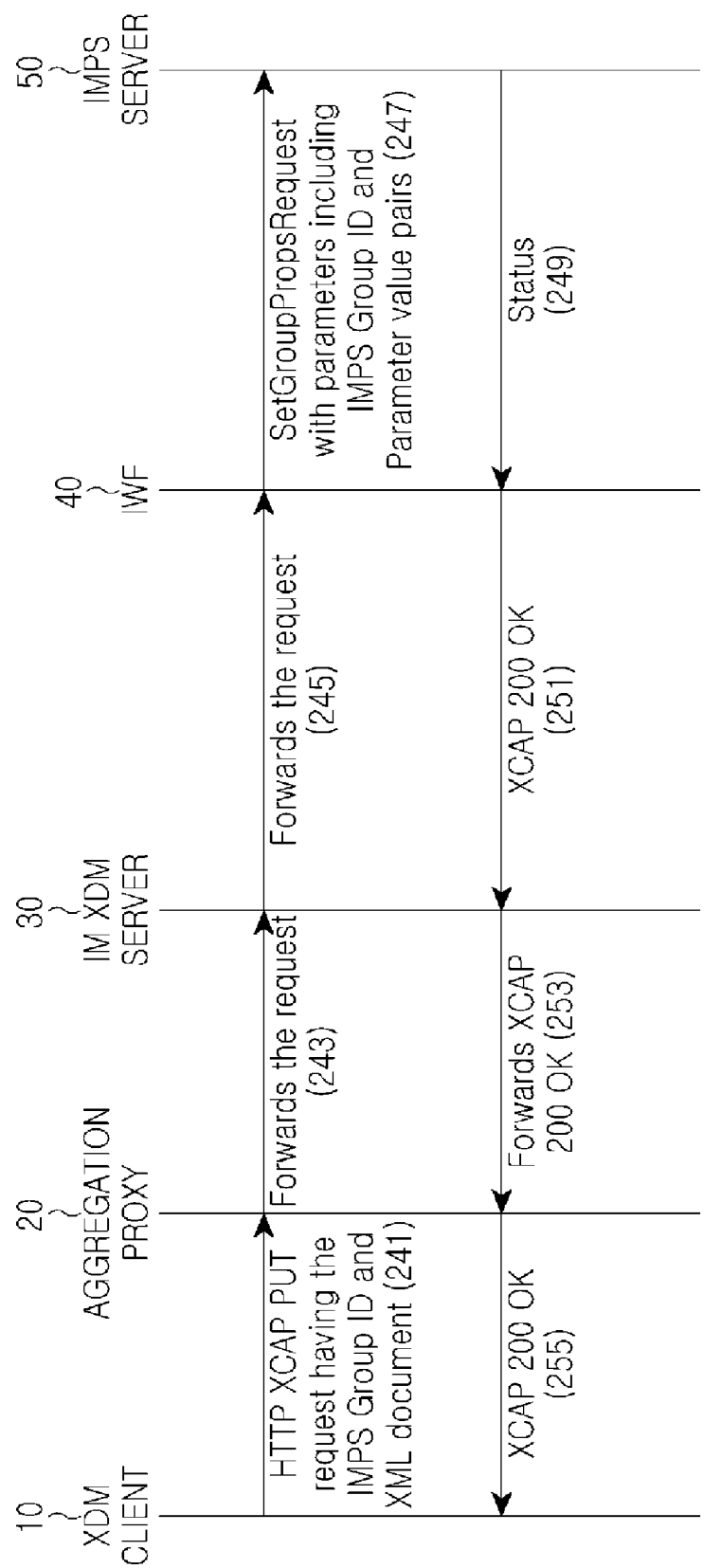
FIG. 5 illustrates a process in which an XDM client in an untrusted domain requests the setting of the properties of a group included in an IMPS system through an IM XDM server and receives a response to the request, according to another embodiment of the present invention.
Figure 6:
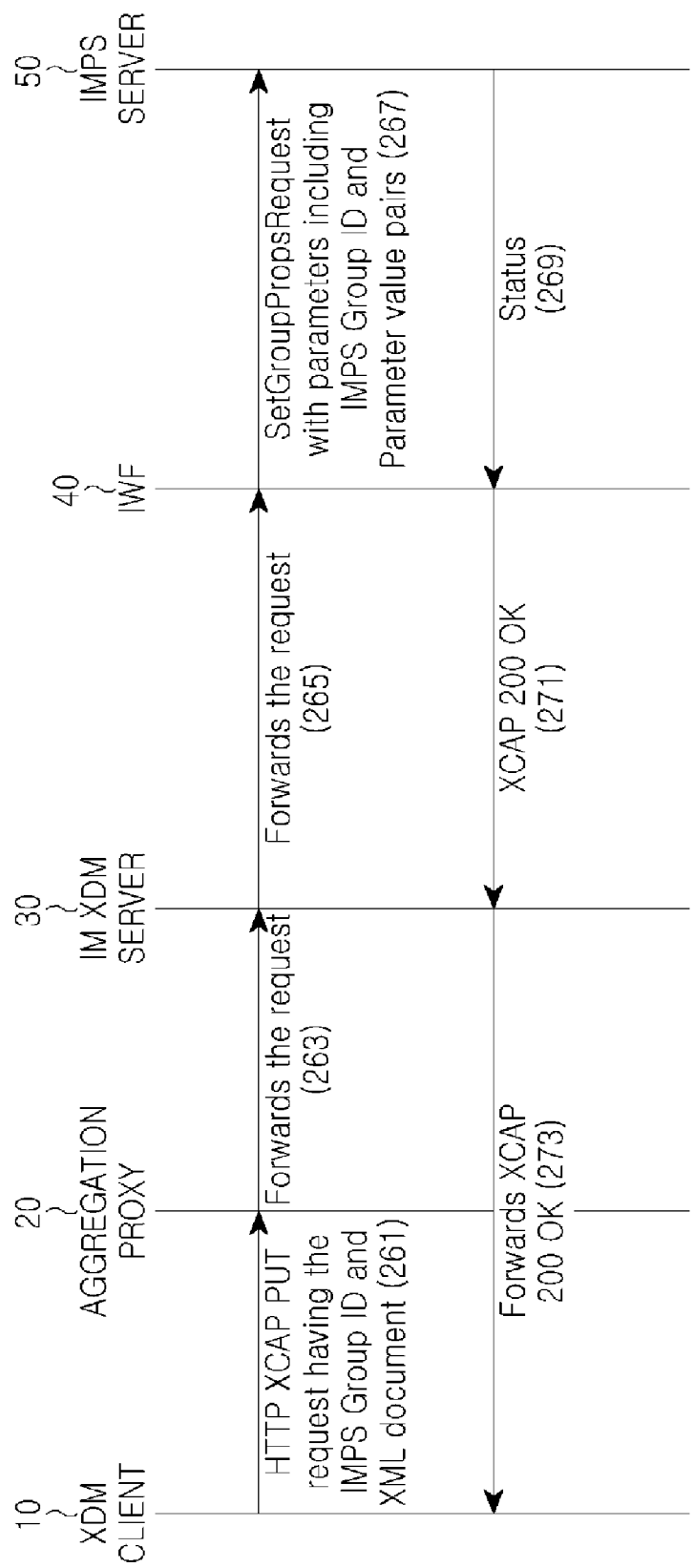
FIG. 6 illustrates a process in which an XDM client in an untrusted domain requests the setting of the properties of a group included in an IMPS system through an IM XDM server and directly receives a response to the request without using an aggregation proxy, according to an embodiment of the present invention.

A process in which the SIMPLE IM user requests the setting of the group properties of a group included in the IMPS server 50 through the XDM client 10 will be described with reference to FIGS. 5 and 6. FIG. 5 illustrates a process in which a SIMPLE IM client in an untrusted domain requests the setting of the group properties of a group included in the IMPS system according to an embodiment of the present invention, and FIG. 6 illustrates a process in which an SIMPLE IM client in an untrusted domain requests the setting of the group properties of a group included in the IMPS system according to another embodiment of the present invention.

Referring to FIG. 5, the XDM client 10 forwards an HTTP XCAP PUT request including the group ID of the targeted group and an XML document including the group properties of the targeted group to the aggregation proxy 20 in step 241 (HTTP XCAP PUT request having the IMPS group ID and XML document). The aggregation proxy 20 forwards the request to the IM XDM server 30 in step 243 (Forwards the request). The IM XDM server 30 understands that the targeted group is included in the IMPS system through the group ID included in the HTTP XCAP PUT request and forwards the request to the IWF 40 in step 24 (Forwards the request). The IWF 40 converts the XCAP PUT request having the IMPS group ID and the group XML document into the IMPS protocol format to generate an IMPS group property setting request SetGroupPropsRequest and forwards the generated SetGroupPropsRequest to the IMPS server 50 in step 247 (SetGroupPropsReuqest with parameters including IMPS group ID and Parameter value pair). The IMPS server 50 sets the group properties of the targeted group according to the contents of the received SetGroupPropsRequest and forwards Status to the IWF 40 as a response to the SetGroupPropsRequest in step 249. The IWF 40 generates an XCAP 200 OK corresponding to the Status and forwards it to the IM XDM server 30 in step 251. The IM XDM server 30 forwards the same response to the XDM client 10 through the aggregation proxy 20 like in steps 253 and 255 of FIG. 5 or directly to the XDM client 10 like in step 273 of FIG. 6. Steps 261 through 271 of FIG. 6 correspond to steps 241 through 251 of FIG. 5.

Figure 7:
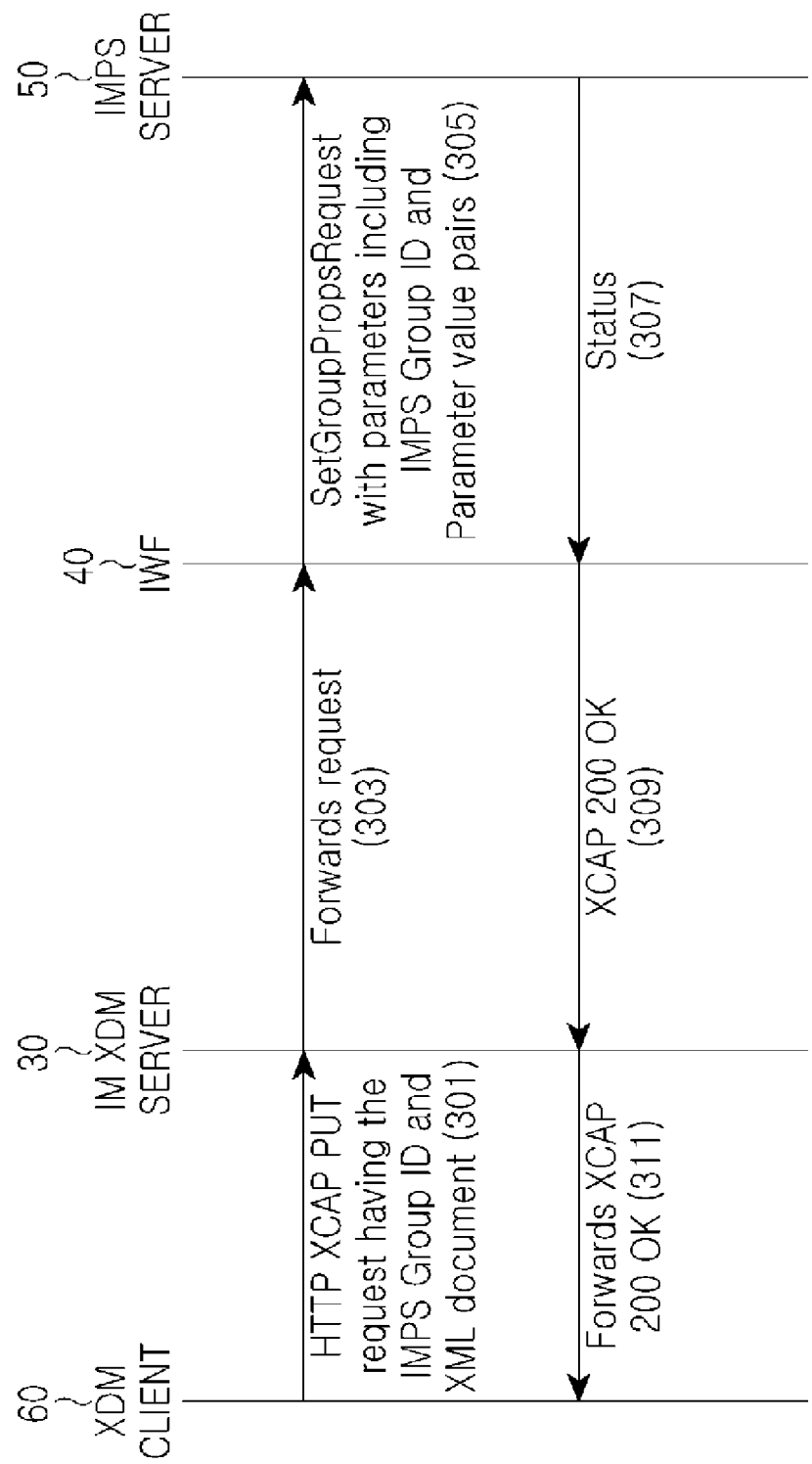
FIG. 7 illustrates a process in which an XDM client in a trusted domain requests the setting of the properties of a group included in an IMPS system through an IM XDM server and receives a response to the request, according to an embodiment of the present invention.

If the XDM client 10 is included in a trusted domain, a process in which the XDM client 10 requests the setting of the properties of a group included in the IMPS system and receives a response to the request is as shown in FIG. 7. FIG. 7 illustrates a process in which a SIMPLE IM client in a trusted domain requests the setting of the properties of a group included in the IMPS system and receives a response to the request, according to an embodiment of the present invention. This scenario may also be applied to a case where the IM server 60 as an XDM client requests the setting of the properties of a group included in the IMPS system and receives a response to the request.

Referring to FIG. 7, the XDM client 60 directly forwards an HTTP XCAP PUT request having the group ID of the targeted group and an XML document including the group properties of the targeted group without using the aggregation proxy 20 in step 301 (HTTP XCAP PUT request having the IMPS group ID and XML document). The IM XDM server 30 understands that the group is included in the IMPS system through the group ID included in the HTTP XCAP PUT request and forwards the request to the IWF 40 in step 303. The subsequent process is similar to that shown in FIGS. 5 and 6. In other words, step 247 of FIG. 5 is similar to step 305 of FIG. 7, step 249 of FIG. 5 is similar to step 307 of FIG. 7, step 251 of FIG. 5 is similar to step 309 of FIG. 7, and step 311 of FIG. 7 is similar to step 273 of FIG. 6.

Figure 8:
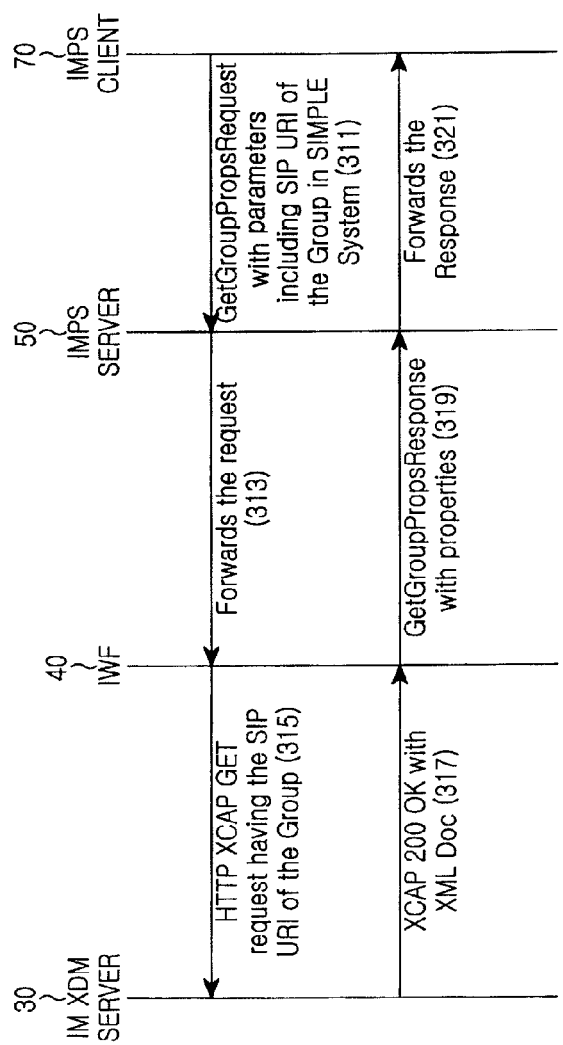
FIG. 8 illustrates a process in which an IMPS client requests the retrieval of the properties of a group included in a SIMPLE IM system and receives a response to the request, according to an embodiment of the present invention.

A process in which an IMPS user manages a static group included in a SIMPLE IM system will be described in detail with reference to FIGS. 8 and 9. FIG. 8 illustrates a process in which an IMPS client requests the retrieval of the group properties of a group included in the SIMPLE IM system and receives a response to the request according to an embodiment of the present invention, and FIG. 9 illustrates a process in which the IMPS client requests the setting of the group properties of a group included in the SIMPLE IM system according to an embodiment of the present invention.

A process in which the IMPS user requests the retrieval of the group properties of a group included in the SIMPLE system and receives a response to the request will be described with reference to FIG. 8. The IMPS client 70 forwards a GetGroupPropsRequest for requesting the retrieval of the properties of the group included in the SIMPLE IM system to the IMPS server 50 in step 311 (GetGroupPropsRequest with parameters including SIP URI of the Group in SIMPLE system). The GetGroupPropsRequest includes an SIP URI of the group included in the SIMPLE system. The IMPS server 50 detects the SIP URI included in the received GetGroupPropsRequest to confirm that the group is included in the SIMPLE IM system and forwards the request to the IWF 40 in step 313 (Forwards the request). The IWF 40 converts the received GetGroupPropsRequest based on an XCAP protocol, generates an HTTP XCAP GET request including the SIP URI of the targeted group, and forwards the request to the IM XDM server 30 in step 315. The IM XDM server 30 retrieves the group properties of the group, composes a group XML document including the retrieved group properties, as a SIMPLE IM group property retrieval response, and forwards an XCAP 200 OK with the XML document to the IWF 40 in step 317. The IWF 40 detects the XML document included in the XCAP 200 OK received from the IM XDM server 30, generates a GetGroupPropsResponse as an IMPS group property response including the retrieved group properties, and forwards the GetGroupPropsResponse to the IMPS server 50 in step 319 (GetGroupPropsResponse with properties). The IMPS server 50 forwards the response to the IMPS client 70 in step 321 (Forwards the Response).

A process in which the IMPS user requests the setting of the group properties of a group included in the SIMPLE IM system using the IMPS client 70 will be described with reference to FIG. 9.

Figure 9:
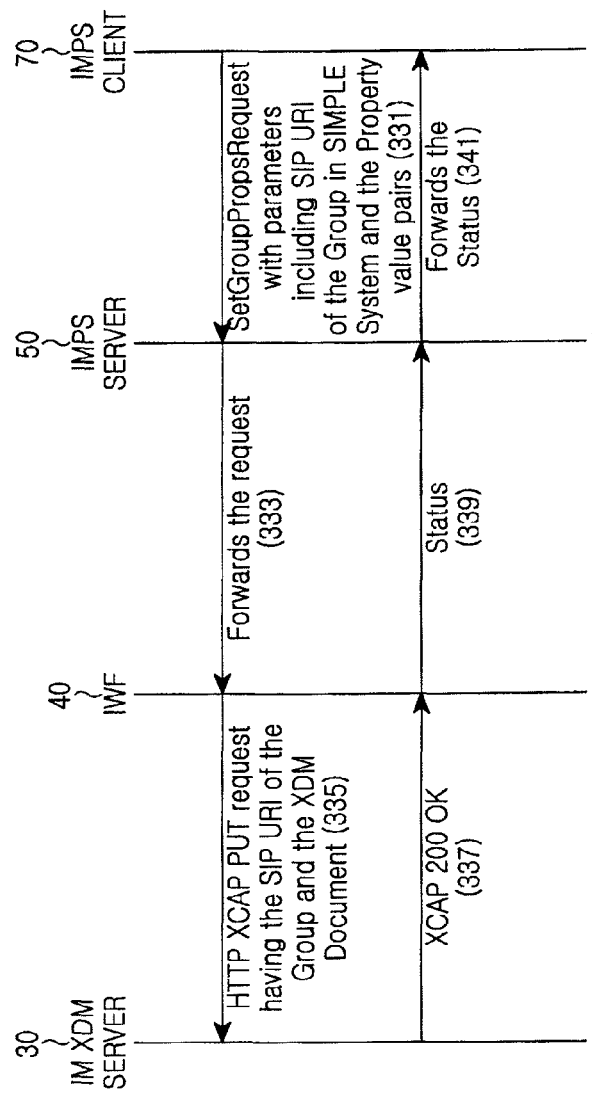
FIG. 9 illustrates a process in which an IMPS client requests the setting of the properties of a group included in a SIMPLE IM system and receives a response to the request, according to an embodiment of the present invention.

Referring to FIG. 9, the IMPS client 70 generates a SetGroupPropsRequest including the SIP URI of a group included in the SIMPLE IM system and the group properties of the targeted group and forwards it to the IMPS server 50 in step 331 (SetGroupPropsRequest with parameters including SIP URI of the Group in SIMPLE system). The IMPS server 50 detects the SIP URI included in the received SetGroupPropsRequest, confirms that the targeted group is included in the SIMPLE IM system, and forwards the request to the IWF 40 in step 333 (Forwards the request). The IWF 40 converts the received SetGroupPropsRequest into the XCAP protocol format, generates an HTTP XCAP PUT request including the SIP URI of the targeted group and an XML document having the group properties to be set, and forwards it to the IM XDM server 30 in step 3335 (HTTP XCAP PUT request having the SIP URI of the Group and the XDM document). The IM XDM server 30 recognizes the group properties included in the received HTTP XCAP PUT request to set the group properties of the targeted group as requested, and forwards an XCAP 200 OK to the IWF 40 in step 337 (XCAP 200 OK). The IWF 40 converts the XCAP 200 OK received from the IM XDM server 30 into the IMPS protocol format, generates an IMPS Status corresponding to the converted XCAP 200 OK, and forwards it to the IMPS server 50 in step 339. The IMPS server 50 forwards the IMPS Status to the IMPS client 70 in step 341 (Forwards the Status).

The present invention enables the SIMPLE IM user to retrieve the group properties of a group included in the IMPS system and the IMPS user to retrieve the group properties of a group included in the SIMPLE IM system. Moreover, the present invention enables the SIMPLE IM user to set the properties of a group included in the IMPS system and the IMPS user to set the properties of a group included in the SIMPLE IM system.

According to another embodiment of the present invention, when the SIMPLE IM client request the retrieval and setting of the group properties of a group included in the IMPS system, the aggregation proxy 20 may enable the retrieval and setting of the group properties by directly transmitting a message to and receiving a message from the IWF 40 without using the IM XDM server 30, as shown in FIGS. 10 through 15.

Figure 10:
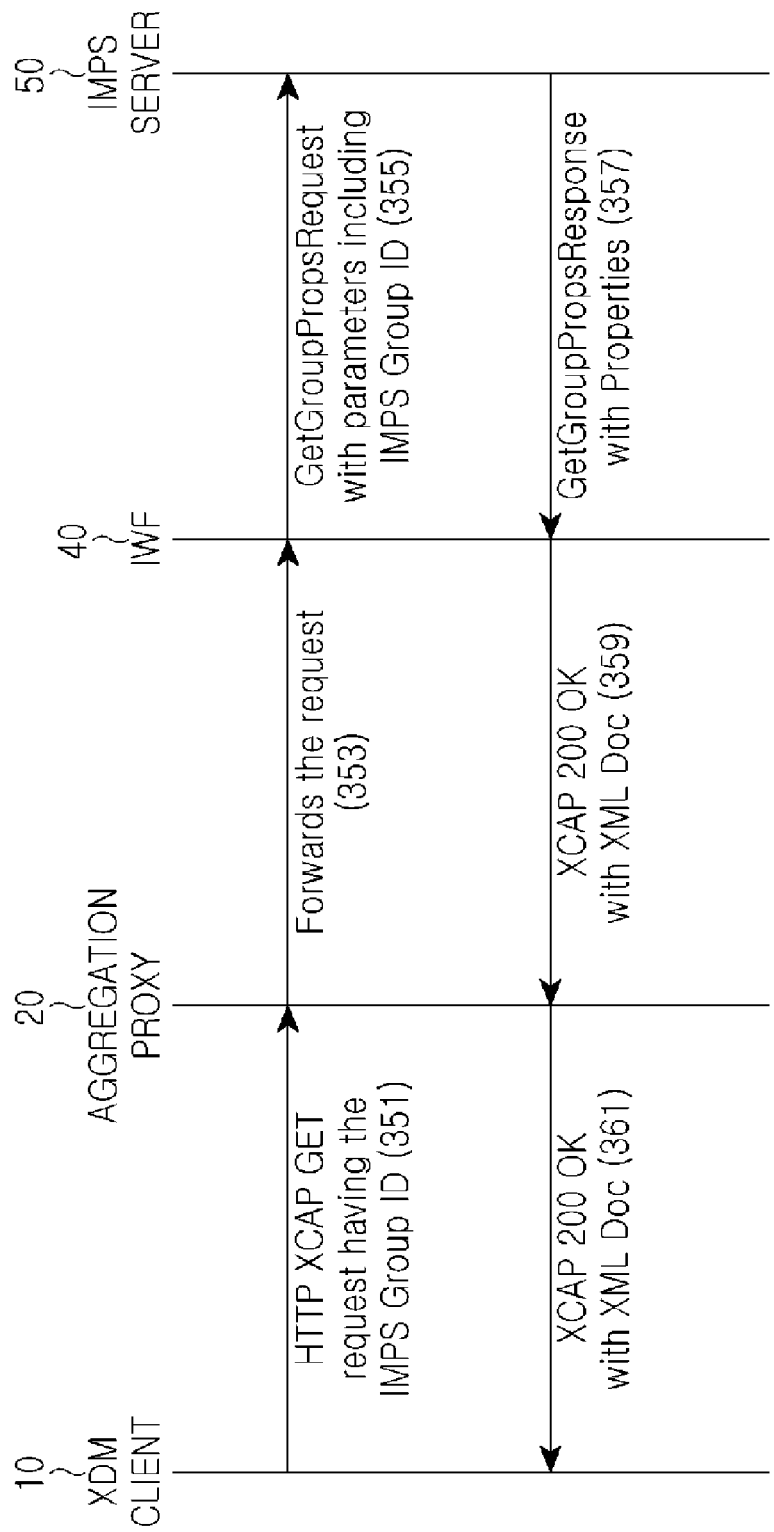
FIG. 10 illustrates a process in which an XDM client in an untrusted domain requests the retrieval of the properties of a group included in an IMPS system and receives a response to the request, according to another embodiment of the present invention.
Figure 11:
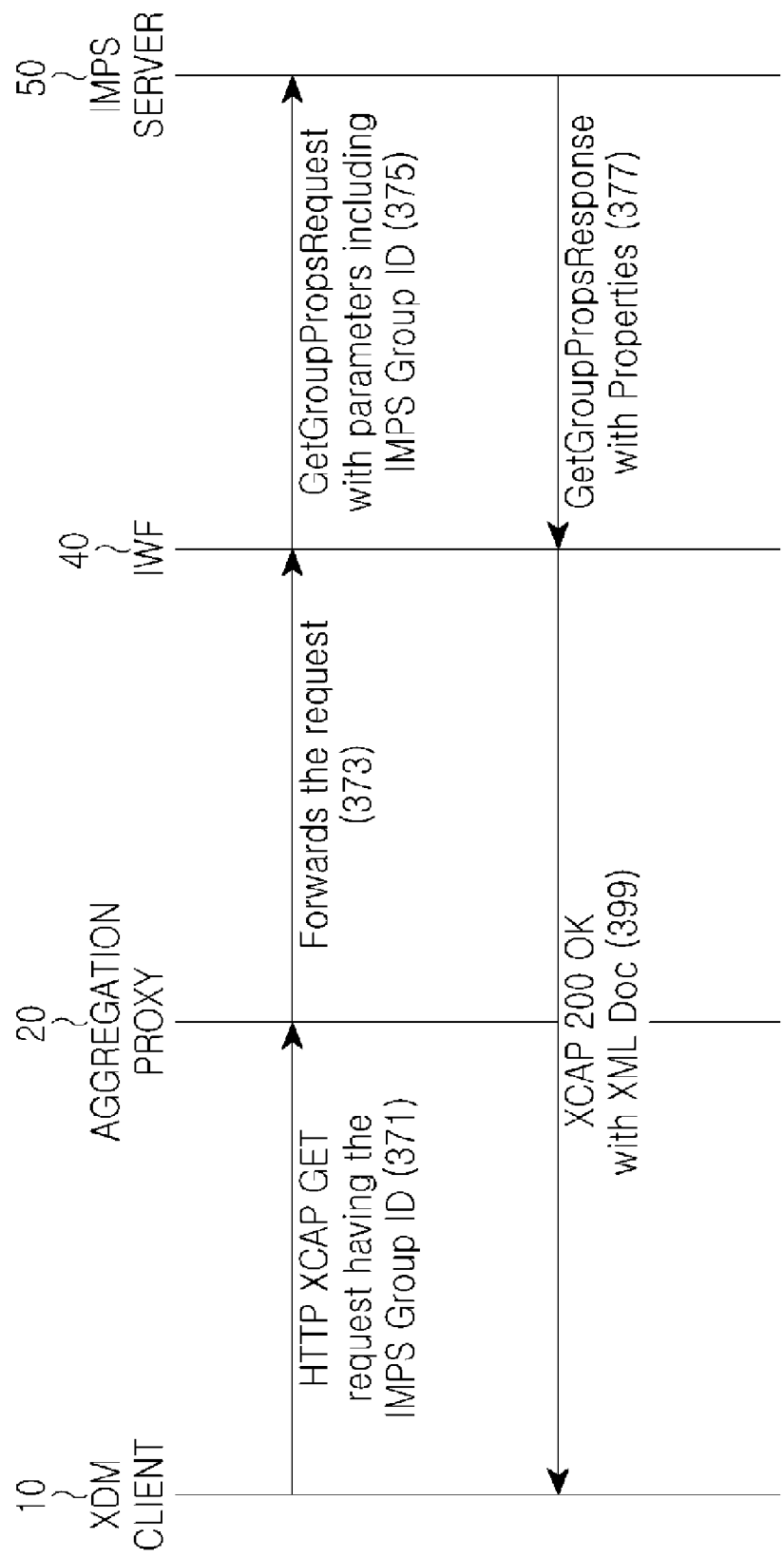
FIG. 11 illustrates a process in which an XDM client in an untrusted domain requests the retrieval of the properties of a group included in an IMPS system and directly receives a response to the request without using an aggregation proxy, according to another embodiment of the present invention.

FIG. 10 illustrates a process in which a SIMPLE IM client in an untrusted domain requests the retrieval of the group properties of a group included in the IMPS system and receives a response to the request, according to another embodiment of the present invention. Referring to FIG. 10, the XDM client 10 in an untrusted domain forwards a group property retrieval request HTTP XCAP GET request to the aggregation proxy 20 in step 351. The HTTP XCAP GET request includes the group ID of the targeted group (HTTP XCAP GET request having the IMPS group ID). The aggregation proxy 20 understands that the targeted group is included in the IMPS system through the group ID included in the HTTP XCAP GET request and forwards the request to the IWF 40 in step 353 (Forwards the request). The IWF 40 receives the HTTP XCAP GET request including the IMPS group ID. The IWF 40 converts the protocol of the group ID with the HTTP XCAP GET request to generate an IMPS group property retrieval request GetGroupPropsRequest and forwards the request to the IMPS server 50 in step 355 (GetGroupPropsRequest with parameters including IMPS group ID). The IMPS server 50 retrieves the properties of the group and forwards an IMPS group property retrieval response GetGroupPropsResponse including the retrieved group properties to the IWF 40 in step 357 (GetGroupPropsResponse with properties). The IWF 40 detects the group properties from the GetGroupPropsResponse received from the IMPS server 50, generates an XML document including the detected group properties according to a SIMPLE protocol, and forwards an XCAP 200 OK including the XML document to the aggregation proxy 20 in step 359 (Forwards XCAP 200 OK with XML Doc), and the aggregation proxy 20 forwards the received XCAP 200 OK to the XDM client 10 in step 361 (XCAP 200 OK with XML Doc). The IWF 40 may also directly forward the XCAP 200 OK to the XDM client 10 without using the aggregation proxy 10 as in step 399. Steps 371 through 377 of FIG. 11 correspond to steps 351 through 357 of FIG. 10.

Figure 14:
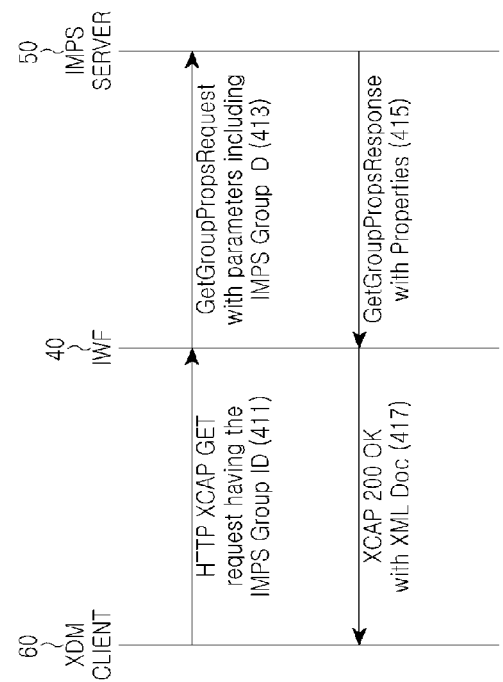
FIG. 14 illustrates a process in which an XDM client in a trusted domain requests the retrieval of the properties of a group included in an IMPS system and receives a response to the request, according to another embodiment of the present invention.

The structure of FIG. 10 may be applied to a case where the XDM client 60 is included in a trusted domain as shown in FIG. 14. FIG. 14 illustrates a process in which a SIMPLE IM client in a trusted domain requests the retrieval of the properties of a group included in the IMPS system and receives a response to the request, according to another embodiment of the present invention. This scenario may also applied to a case where the IM server 60 as the XDM client requests the retrieval of the properties of a group included in the IMPS system and receives a response to the request. Referring to FIG. 14, the XDM client 60 in a trusted domain understands that the targeted group is included in the IMPS system and forwards a group property retrieval request HTTP XCAP GET request including the group ID of the targeted group to the IWF 40 in step 411 (HTTP XCAP GET request having the IMPS group ID). The IWF 40 understands that the targeted group is included in the IMPS system through the group ID included in the HTTP XCAP GET request, performs protocol conversion to generate an IMPS group property retrieval request GetGroupPropsRequest, and forwards the request to the IMPS server 50 in step 413 (GetGroupPropsRequest with parameters including IMPS group ID). The IMPS server 50 retrieves the properties of the group and forwards a GetGroupPropsResponse including the retrieved properties of the group to the IWF 40 in step 415 (GetGroupPropsResponse with properties). The IWF 40 detects the group properties from the GetGroupPropsResponse received from the IMPS server 50 to generate an XML document including the detected group properties according to a SIMPLE protocol and forwards an XCAP 200 OK including the XML document to the XDM client 60 in step 417 (XCAP 200 OK with XML Doc).

Figure 12:
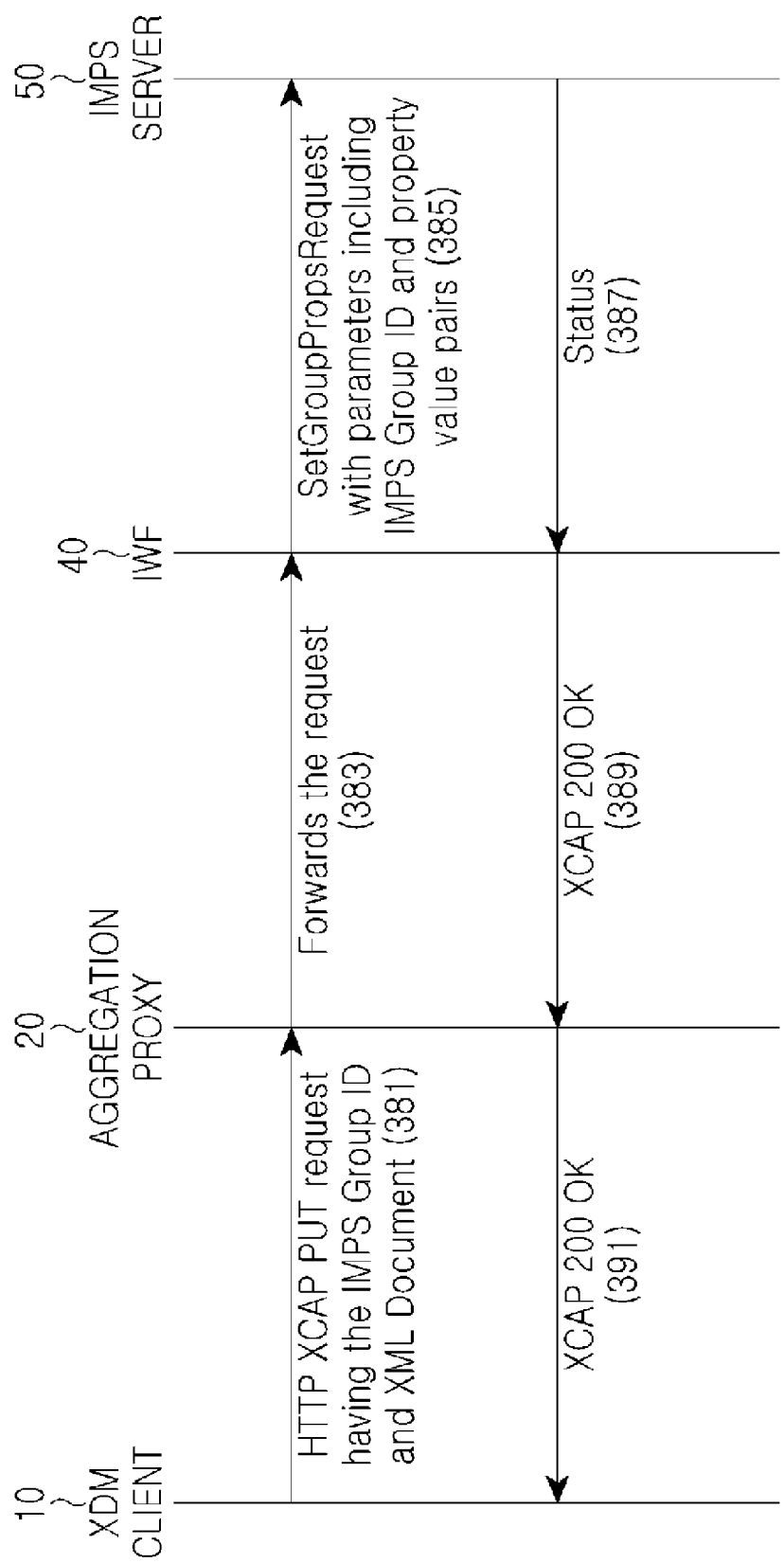
FIG. 12 illustrates a process in which an XDM client in an untrusted domain requests the setting of the properties of a group included in an IMPS system and directly receives a response to the request, according to another embodiment of the present invention.
Figure 13:
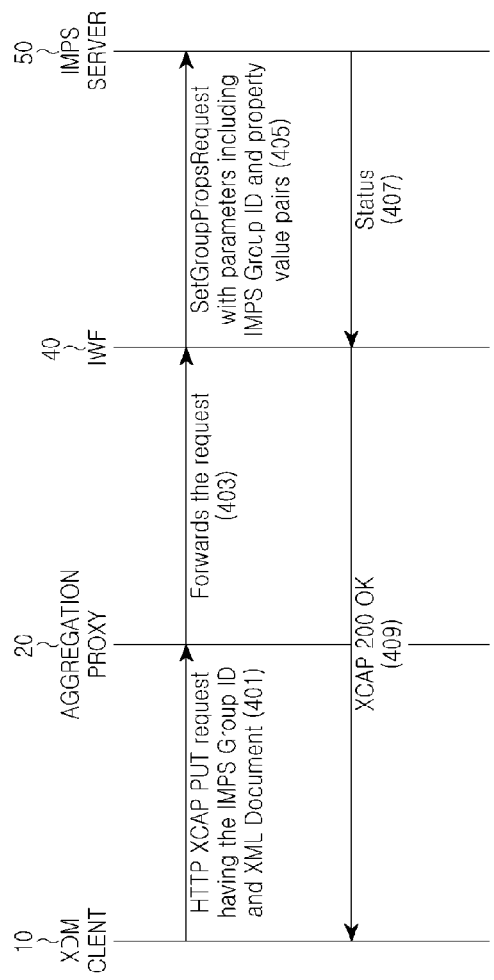
FIG. 13 illustrates a process in which an XDM client in an untrusted domain requests the setting of the properties of a group included in an IMPS system and directly receives a response to the request without using an aggregation proxy, according to another embodiment of the present invention.

FIG. 12 illustrates a process in which a SIMPLE IM client in an untrusted domain requests the setting of the group properties of a group included in the IMPS system and receives a response to the request, according to another embodiment of the present invention. Referring to FIG. 12, the XDM client 10 in an untrusted domain forwards an HTTP XCAP PUT request including the ID of a targeted group and an XML document including the group properties of the targeted group to be set to the aggregation proxy 20 in step 381 (HTTP XCAP PUT request having the IMPS group ID and XML document0. The aggregation proxy 20 understands that the targeted group is included in the IMPS system through the group ID included in the HTTP XCAP PUT request and forwards the request to the IWF 40 in step 383 (Forwards the request). The IWF 40 performs protocol conversion with respect to the XCAP PUT request including the IMPS group ID and the group XML document to generate a SetGroupPropsRequest and forwards it to the IMPS server 50 in step 385 (SetGroupPropsRequest with parameters including IMPS group ID and Parameter value pair). The IMPS server 40 sets the group properties of the group according to the contents included in the received SetGroupPropsRequest and forwards a Status as a response to the SetGroupPropsRequest to the IWF 40 in step 387. The IWF 40 generates an XCAP 200 OK corresponding to the Status, forwards it to the aggregation proxy 20 in step 389, and the aggregation proxy 20 forwards the XCAP 200 OK to the XDM client 10 in step 391. The IWF 40 may also forwards the XCAP 200 OK directly to the XDM client 10 without using the aggregation proxy 20 as in step 409 of FIG. 13. Steps 401 through 407 of FIG. 13 correspond to steps 381 through 387 of FIG. 12.

Figure 15:
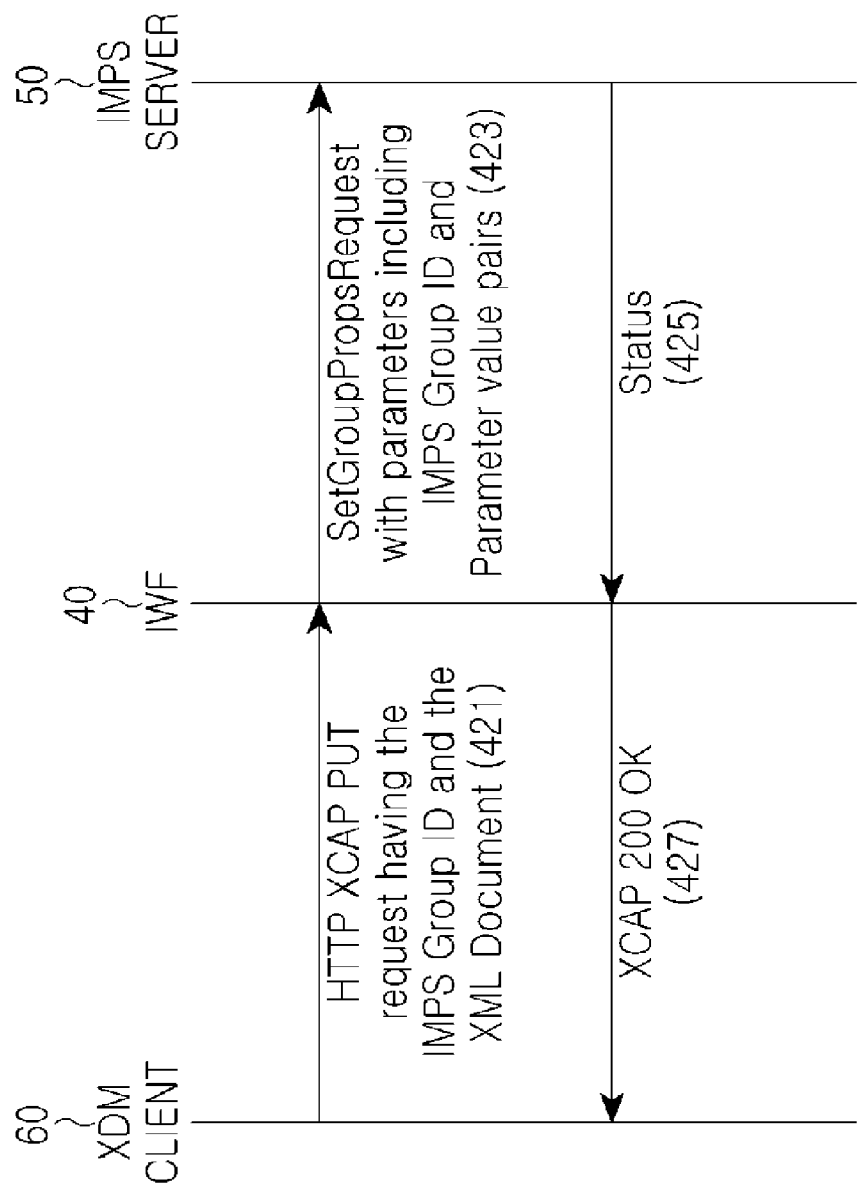
FIG. 15 illustrates a process in which an XDM client in a trusted domain requests the setting of the properties of a group included in an IMPS system and receives a response to the request, according to another embodiment of the present invention.

If the XDM client 60 is included in a trusted domain, it setting of the properties of a group included in the IMPS system and receives a response to the request as shown in FIG. 15. FIG. 15 illustrates a process in which a SIMPLE IM client in a trusted domain requests the setting of the properties of the group included in the IMPS system according to another embodiment of the present invention. This scenario may also be applied to a case where the IM server 60 as the XDM client requests the setting of the group properties of the group included in the IMP system and receives a response to the request.

Referring to FIG. 15, the XDM client 60 in a trusted domain understands that the targeted group is included in the IMPS system and forwards an HTTP XCAP PUT request including the ID of the targeted group and a group XML document with the group properties of the group to be set directly to the IWF 40 without using the aggregation proxy 20 in step 421 (HTTP XCAP PUT request having the IMPS group ID and XML document). The IWF 40 understands that the targeted group is included in the IMPS system through the group ID included in the HTTP XCAP PUT request, performs protocol conversion with respect to the XCAP PUT request including the IMPS group ID and the group XML document to generate an IMPS group property setting request SetGroupPropsRequest, and forwards it to the IMPS server 50 in step 423 (SetGroupPropsRequest with parameters including IMPS group ID and Parameter value pair). The IMPS server 50 sets the group properties of the group according to the contents included in the received SetGroupPropsRequest and forwards a Status as a response to the SetGroupPropsRequest to the IWF 40 in step 425. The IWF 40 generates an XCAP 200 OK corresponding to the Status and forwards it directly to the XDM client 10 in step 427.

Figure 16:
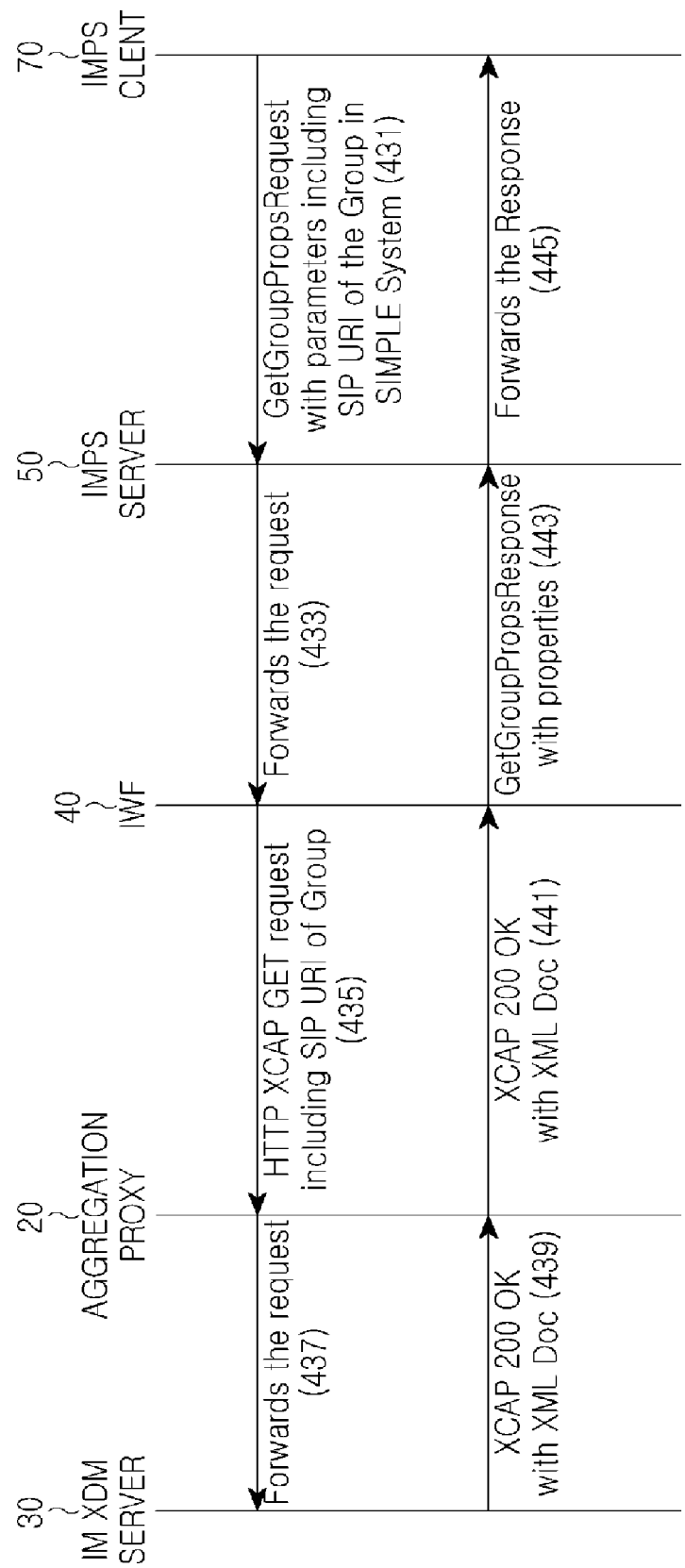
FIG. 16 illustrates a process in which an IMPS client requests the retrieval of the properties of a group included in a SIMPLE IM system through an aggregation proxy and receives a response to the request, according to another embodiment of the present invention.
Figure 17:
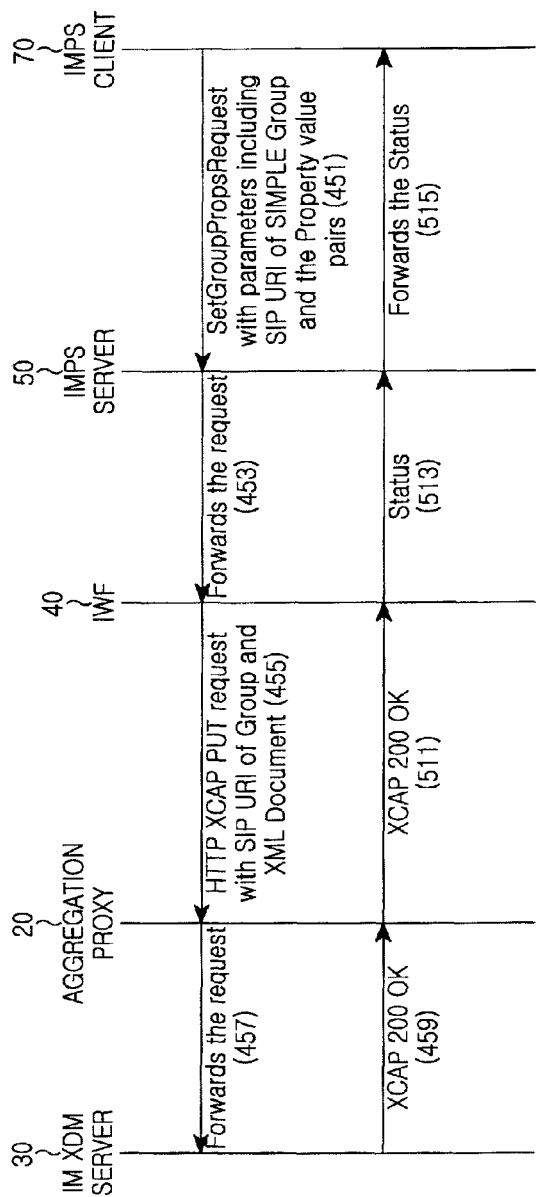
FIG. 17 illustrates a process in which an IMPS client requests the setting of the properties of a group included in a SIMPLE IM system through an aggregation proxy and receives a response to the request, according to another embodiment of the present invention.

When the IMPS client requests the retrieval or setting of the properties of a group included in the SIMPLE IM system, the IM XDM server 30 and the IWF 40 may be constructed to be connected with each other by the aggregation proxy 20 as shown in FIGS. 16 and 17. FIG. 16 illustrates a process in which an IMPS client requests the retrieval of the group properties of a group included in the SIMPLE IM system and receives a response to the request, according to another embodiment of the present invention, and FIG. 17 illustrates a process in which an IMPS client requests the setting of the group properties of a group included in the SIMPLE IM system and receives a response to the request, according to another embodiment of the present invention.

A process in which an IMPS user requests the retrieval of the properties of a group included in the SIMPLE system and receives a response to the request will be described with reference to FIG. 16. The IMPS client 70 forwards a GetGroupPropsRequest for requesting the retrieval of the properties of a group included in the SIMPLE IM system to the IMPS server 50 in step 431 (GetGroupPropsRequest with parameters including SIP URI of the Group in SIMPLE system). The GetGroupPropsRequest includes the SIP URI of the group included in the SIMPLE system. The IMPS server 50 detects the SIP URI included in the received GetGroupPropsRequest, understands that the targeted group is included in the SIMPLE IM system, and forwards the request to the IWF 40 in step 433. The IWF 40 converts the received GetGroupPropsRequest according to the XCAP protocol to generate an HTTP XCAP GET request and forwards it to the aggregation proxy 20 in step 435 (HTTP XCAP GET request including SIP URI of Group). The aggregation proxy 20 forwards the received request to the IM XDM server 30 in step 437. The IM XDM server 30 retrieves the group properties of the group, composes a group XML document including the retrieved group properties as a SIMPLE IM group property retrieval response, and forwards an XCAP 200 OK including the group XML document to the aggregation proxy 20 in step 439 (XCAP 200 OK with XML Doc). The aggregation proxy 20 forwards the received response to the IWF 40 in step 441. The IWF 40 detects the XML document included in the XCAP 200 OK received from the IM XDM server 30, generates an IMPS group property response GetGroupPropsResponse including the retrieved group properties, and forwards it to the IMPS server 50 in step 443 (GetGroupPropsResponse with properties). The IMPS server 50 forwards the received GetGroupPropsResponse to the IMPS client 70 in step 445 (Forwards the Response).

A process sin which the IMPS user requests the setting of the group properties of a group included in the SIMPLE IM system using the IMPS client 70 will be described with reference to FIG. 17.

Referring to FIG. 17, the IMPS client 70 generates a SetGroupPropsRequest including the SIP URI of a group included in the SIMPLE IM system and the group properties to be set and forwards it to the IMPS server 50 in step 451 (SetGroupPropsRequest with parameters including SIP URI of the Group in SIMPLE System and the Property value pairs). The IMPS server 50 detects the SIP URI included in the received SetGroupPropsRequest, understands that the targeted group is included in the SIMPLE IM system, and forwards it to the IWF 40 in step 435 (Forwards the request). The IWF 40 converts the received SetGroupPropsRequest into the XCAP protocol format, generates an HTTP XCAP PUT including the SIP URI of the targeted group and an XML document with the group properties to be set, and forwards it to the aggregation proxy 20 in step 455 (HTTP XCAP PUT request having the SIP URI of the Group and the XDM document). The aggregation proxy 20 forwards the received request to the IM XDM server 30 in step 457. The IM XDM server 30 recognizes the group properties included in the received HTTP XCAP PUT, sets the group properties of the group as requested, and forwards an XCAP 200 OK to the aggregation proxy 20 in step 459. The aggregation proxy 20 forwards the received response to the IWF 40 (XCAP 200 OK). The IWF 40 converts the XCAP 200 OK received from the IM XDM server 30 according to the IMPS protocol, generates a corresponding IMPS Status, and forwards it to the IMPS server 50 in step 513. The IMPS server 50 forwards the IMPS Status to the IMPS client 70 in step 515 (Forwards the Status).

While the present invention has been shown and described with reference to preferred embodiments thereof, it will be understood by those skilled in the art that various changes in form and details may be made therein without departing from the spirit and scope of the invention.

Industrial Applicability

As described above, the present invention enables the SIMPLE IM user to retrieve the group properties of a group included in the IMPS system and the IMPS user to retrieve the group properties of a group included in the SIMPLE IM system. The present invention may also enable the SIMPLE IM user to set the group properties of a group included in the IMPS system and the IMPS user to set the group properties of a group included in the SIMPLE IM system.

The invention claimed is:

1. A group management method for group communication in an interworking system of an Instant Messaging and Presence Services (IMPS) system and a Session Initiation Protocol for Instant Messaging and Presence Leveraging Extensions Instant Messaging (SIMPLE IM) system, the group management method of Interworking Function (IWF) connecting to the IMPS system and SIMPLE IM system comprising the steps of:

receiving a group property request message including one of a request for the retrieval of a group properties of a group (GetGroupPropsRequest or HTTP XCAP GET request) and a request for a setting of group properties of the group (SetGroupPropsRequest or HTTP XCAP PUT request) from a client terminal, the client terminal currently connected to one of the IMPS system and the SIMPLE IM system;

identifying the group included in the group property request message;

converting the group property request message into a protocol format supported by the other system, if the group is included in the other system to which the client terminal is not connected, and forwarding the converted group property request message to the other system;

receiving a group property response message including the group properties of the group; and converting the group property response message into a protocol format supported by the currently connected system and forwarding the converted group property response message to the client terminal, wherein the group properties of the group are group properties of the group changed according to the setting of the group properties of the group if the group property request message includes the request for the setting of the group properties of the group, wherein the group property request message includes an ID associated with the system including the group, and wherein if the currently connected system is the IMPS system, the client terminal forwards a GetGroupPropsRequest for requesting the retrieval of the group properties and the GetGroupPropsRequest includes the group ID of the group, and the GetGroupPropsRequest is converted into the group property retrieval request of the SIMPLE IM system, the group property retrieval request of the SIMPLE IM system being a HTTP XCAP GET, during the protocol conversion, and is forwarded to the SIMPLE IM system.

2. The group management method of claim 1, wherein the other system sets the group properties of the group according to the requesting the setting the group properties of the group, generates a group property setting response including the setting result, and forwards the group property setting response;

the IWF converts the group property setting response into a protocol format supported by the currently connected system and forwards the converted group property setting response to the currently connected system; and the currently connected system forwarding the group property setting response to the client terminal.

3. The group management method of claim 1, wherein the group property request message includes an ID associated with the system including the group and properties to be set.

4. The group management method of claim 3, wherein if the currently connected system is the SIMPLE IM system, the client terminal forwards an HTTP XCAP PUT for requesting the setting of the group properties and the HTTP XCAP PUT includes the group ID of the group and group properties to be set, and the HTTP XCAP PUT is converted into the group property setting request of the IMPS system, the group property setting request being a SetGroupPropsRequest, during the protocol conversion and is forwarded.

5. The group management method of claim 4, wherein the group property setting response is a Status including the result of setting the group properties requested by the IMPS system, and the Status is converted into an XCAP response including the XCAP 200 OK that is the group property setting response of the SIMPLE IM system, during the protocol conversion and is forwarded to the SIMPLE IM system.

6. The group management method of claim 3, wherein if the currently connected system is the IMPS system, the client terminal forwards a SetGroupPropsRequest for requesting the setting of the group properties and the SetGroupPropsRequest includes the group ID of the group and group properties to be set, and the SetGroupPropsRequest is converted into the group property setting request of the SIMPLE IM system, the group property setting request of the SIMPLE IM system being an HTTP XCAP PUT, during the protocol conversion and is forwarded.

7. The group management method of claim 6, wherein the group property setting response is an XCAP response including an XCAP 200 OK having the result of setting the group properties requested by the SIMPLE IM system and the XCAP response including the XCAP 200 OK is converted into a group property setting response of the IMPS system, the group property setting response of the IMPS system being a Status, during the protocol conversion and is forwarded to the IMPS system.

8. The group management method of claim 1, wherein if the currently connected system is the SIMPLE IM system, the client terminal forwards an HTTP XCAP GET for requesting the retrieval of the group properties and the HTTP XCAP GET includes the group ID of the group, and the HTTP XCAP GET request is converted into a group property retrieval request GetGroupPropsRequest of the IMPS system during the protocol conversion, and is forwarded to the IMPS system.

9. The group management method of claim 8, wherein the group property response message is a GetGroupPropsResponse including the group properties retrieved by the IMPS system and the GetGroupPropsResponse is converted into the group property retrieval response of the SIMPLE IM system, the group property retrieval response of the SIMPLE IM system being an XCAP 200 OK including a group XML document, during the protocol conversion, and is forwarded to the SIMPLE IM system.

10. The group management method of claim 1, wherein the group property retrieval response is an XCAP 200 OK including a group XML document including the group properties retrieved by the SIMPLE IM system, and the XCAP 200 OK is converted into the group property retrieval response of the IMPS system, the group property retrieval response of the IMPS system being a GetGroupPropsResponse, during the protocol conversion, and is forwarded to the IMPS system.

11. A method for requesting group property of a group associated with an Instant Messaging and Presence Services (IMPS) system in an interworking system of the IMPS system and a Session Initiation Protocol for Instant Messaging and Presence Leveraging Extensions Instant Messaging (SIMPLE IM) system, the method of at least one of client terminals connected to the SIMPLE IM system comprising the steps of:
generating a group property request message including one of a request for a retrieval of a group properties of the group and a request for a setting of a group properties of the group, the group property request message including a group ID of the group;
transmitting the group property request message to a SIMPLE IM server connected to Interworking Function (IWF);
identifying the group included in the request message; and
receiving a group property response message corresponding to the group property request message from the IMPS system through the SIMPLE IM server;
wherein the group property request message is converted into a protocol format supported by the IMPS system, at the IWF and is transmitted from the IWF to the IMPS system and the group property response message received from the IMPS system is converted into a protocol format supported by the SIMPLE IM system at the IWF and transmitted from the IWF to the SIMPLE IM system,
wherein the group properties of the group are group properties of the group changed according to the setting of the group properties of the group if the group property request message includes the request for the setting of the group properties of the group, and
wherein the client terminal forwards an HTTP XCAP PUT for requesting the setting of the group properties and the HTTP XCAP PUT includes the group ID of the group and group properties to be set, and the HTTP XCAP PUT is converted into the group property setting request of the IMPS system, i.e., a SetGroupPropsRequest, during the protocol conversion and is forwarded.

12. The method of claim 11, wherein the client terminal forwards an HTTP XCAP GET for requesting the retrieval of the group properties and the HTTP XCAP GET includes the group ID, and the HTTP XCAP GET request is converted into a group property retrieval request SetGroupPropsRequest of the IMPS system during the protocol conversion, and is forwarded to the IMPS system.

13. The method of claim 12, wherein the group property response message is a GetGroupPropsResponse including the group properties retrieved by the IMPS system and the GetGroupPropsResponse is converted into the group property retrieval response of the SIMPLE IM system i.e., an XCAP 200 OK including a group XML document, during the protocol conversion, and is forwarded to the SIMPLE IM system.

14. The method of claim 11, wherein the group property setting response is a Status including the result of setting the group properties requested by the IMPS system, and the Status is converted into an XCAP response including the XCAP 200 OK that is the group property setting response of the SIMPLE IM system, during the protocol conversion and is forwarded to the SIMPLE IM system.

* * * * *